United States Patent [19]

Laidler

[11] Patent Number: 5,023,766
[45] Date of Patent: Jun. 11, 1991

[54] POWER SUPPLY UTILIZING TRANSFORMERLESS OPTICAL DRIVING CONTROL CIRCUIT

[75] Inventor: Graham A. Laidler, Ipswich, England

[73] Assignee: British Telecommunications Public Limited Company, United Kingdom

[21] Appl. No.: 490,521

[22] Filed: Mar. 2, 1990

Related U.S. Application Data

[63] Continuation of Ser. No. 150,947, Feb. 1, 1988, abandoned.

[30] Foreign Application Priority Data

Feb. 2, 1987 [GB] United Kingdom ............... 8702299

[51] Int. Cl.⁵ ........................................... H02M 3/335
[52] U.S. Cl. ..................................... 363/16; 363/17; 363/49; 363/98; 323/902
[58] Field of Search ................. 363/16, 17, 24–26, 363/97, 98, 131–134, 143; 323/299, 902

[56] References Cited

U.S. PATENT DOCUMENTS

| | | | |
|---|---|---|---|
| 3,596,165 | 7/1971 | Andrews | 363/16 |
| 3,663,838 | 5/1972 | Reimers | 323/902 |
| 4,126,819 | 11/1978 | Stobbe et al. | |
| 4,349,776 | 9/1982 | Federico et al. | 323/902 |
| 4,378,585 | 3/1983 | Bete | 323/902 |
| 4,464,709 | 8/1984 | Barter | 363/16 |
| 4,628,426 | 12/1986 | Steigerwald | 363/17 |
| 4,656,412 | 4/1987 | McLyman | 363/17 |
| 4,691,275 | 9/1987 | Moscovici | 363/17 |
| 4,692,851 | 9/1987 | Attwood | 363/16 |
| 4,713,740 | 12/1987 | Drabing | 363/17 |
| 4,729,085 | 3/1988 | Truskalo | 363/17 |

FOREIGN PATENT DOCUMENTS

| | | | |
|---|---|---|---|
| 2088070 | 1/1972 | France. | |
| 0531141 | 4/1977 | U.S.S.R. | 323/902 |
| 2131209 | 6/1984 | United Kingdom. | |

Primary Examiner—Peter S. Wong
Attorney, Agent, or Firm—Nixon & Vanderhye

[57] ABSTRACT

A power supply receives and rectifies mains voltage using bridge D1–D4. This is used by a pair of transistors Q1 and Q2 to alternate the supply to a transformer T via capacitor C8. Outputs are available from secondary windings T2, T6 and T7. Further windings T4 and T5 provide an internal power source for system circuitry which includes optical regulation via IC1 and optical switching control using IC2.

17 Claims, 1 Drawing Sheet

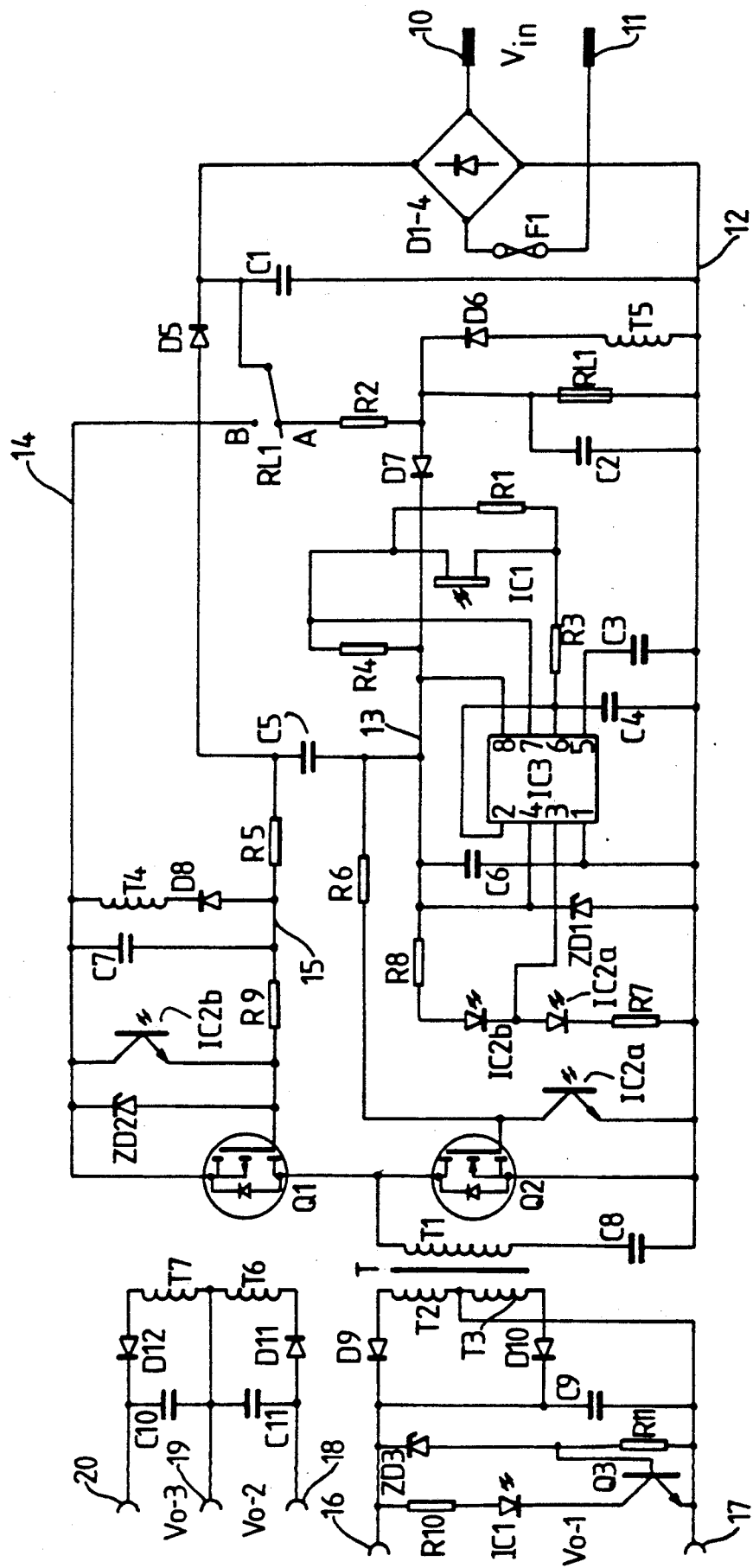

1

POWER SUPPLY UTILIZING TRANSFORMERLESS OPTICAL DRIVING CONTROL CIRCUIT

This is a continuation of application Ser. No. 07/150,947, filed Feb. 1, 1988, now abandoned.

FIELD OF THE INVENTION

The invention relates to a power supply system.

Traditionally power supplies for powering electronic circuits consisted of a mains transformer with a step-down secondary winding and a rectifier followed by capacitor smoothing to provide the low voltage d.c. supply. As a need for more precise regulation arose, such as required for transistor or logic chip circuits, semiconductor regulators were also employed.

BACKGROUND AND SUMMARY OF THE INVENTION

An alternative form of power supply is the 'switch mode' system which employs a fixed frequency oscillator control running at several KHz, and controlled by varying the mark: space ratio of this frequency.

With such known arrangements the operating efficiency is not very high and may be subject to substantial heat generation and subsequent dissipation problems.

The present invention is directed to improving on such known power supplies.

According to the invention there is provided a power supply system including:
first and second series connected switching means, connected to receive a d.c. voltage;
transformer means having a first winding connected to the switching means and having a second winding configured to provide a power supply output at a desired voltage;
first rectification means for converting this voltage into a substantially d.c. voltage; regulation means for controlling the output within desired limits; and optical-feedback means for providing a control path from said regulation means to said switching means to modify the switching frequency of the switching means to compensate for detected output errors.

BRIEF DESCRIPTION OF THE DRAWINGS

The sole drawing FIGURE illustrates the preferred embodiment of the improved power supply.

DETAILED DESCRIPTION OF THE DRAWING

The invention will now be described by way of examples with reference to the accompanying drawing which shows an embodiment of the power supply.

A mains voltage bridge rectifier is connected to the mains supply inputs 10,11 and its d.c. output is connected across a capacitor C1. One side of the capacitor C1 is connected to the ground rail 12, and its other side is connected to relay contact RL1 switchable between positions A or B. The A position connects the capacitor C1 via a resistor R2 and diode D7 to a first positive rail 13 and in the B position to a second positive rail 14. The connection node of diode D7 is also connected to diode D6 which is series connected with a secondary winding T5 of the supply transformer T. In parallel there is the relay coil RL1 with capacitor C2 connected across it. Diode D5 connects between the capacitor C5 and the capacitor C1. Between rails 12 and 13 there is connected a timer integrated circuit IC3. In this example, a type 555 is employed which is an 8 pin device. Pin 1 is connected to ground 12 and to capacitor C6 which has its other lead connected to rail 13. Trigger pin 2 is directly connected to pin 6 and is connected to capacitor C4 which is then connected to rail 12. Pin 6 is also connected to rail 13 via resistors R3, R1 and R4. Pin 4 is the reset input connected to zener diode ZD1 and to rail 13, (the other end of ZD1 being connected to rail 12). Pin 5 is the control pin connected to capacitor C3 which is then connected to rail 12. Discharge pin 7 is connected to resistor R4 which is then connected to rail 13. In this configuration the timer operates as an oscillator. The oscillator output from pin 3 is connected to the interconnection point of the light-emitting-diodes (LEDs) within IC2 (eg type ILD74). The diode portions of IC2a,b. One photo-transistor portions IC2a,b. One photo-transistor IC2a is connected to rails 12 and 13 (via resistor R6) and the other IC2b is connected to rails 14 and 15 (via resistor R9). The series connected LEDs of IC2 are connected across the rails 12 and 13 via current limiting resistors R7 and R8.

An opto-coupled FET (eg type H11F1) device IC1 has its transistor portion connected in parallel to R1. The LED portion of IC1 is connected in series with a resistor R10 across the power unit outputs 16, 17 via collector/emitter electrodes of transistor Q3. In parallel with these is a capacitor C9 and these are connected to receive the output of centre tapped secondary windings T2 and T3 of transformer T via rectifier diodes D9 and D10. A zener diode ZD3 is series connected with a resistor R11 to rail 17. The junction of ZD3 and R11 is connected to the base of the transistor Q3. Further windings T6 and T7 of the transformer provide rectified outputs to terminals 18–20 via diodes D11 and D12. Smoothing is provided by capacitors C10, C11. No other regulation is provided for these outputs. The primary winding T1 of the transformer is connected via capacitor C8 across the source and drain of a power FET (eg VMOS type 2SK310), Q2 its gate being connected to the collector of IC2a. In series with this FET there is a second FET Q1 (eg VMOS type 2SJ117) which series devices are connected between rails 12 and 14. The gate of Q1 is connected to the common connection of a zener diode ZD2, the emitter of opto-transistor IC2b, and resistor R9. A capacitor C7 is connected between rails 14 and 15 and a diode D8 is a series connected from rail 15 to the rail 14 via a secondary winding T4 of transformer T. A resistor R5 from the rail 15 is connected in series with capacitor C5 to the rail 13.

The system operates as follows.

On connection of the 240 a.c. supply to terminals 10 and 11, the rectified output from D1–D4 charges C1 up to approximately 339 volts d.c. The relay contact RL1, at switch on, will be in position A as shown in the Figure and this will allow the d.c. voltage from the bridge to charge up C6 (via R2 and D7) and charge up C2 (via R2) until the potential is sufficient to energise relay coil RL1 (eg 12 V).

Until RL1 is energised, C6 will provide power to IC2 and 3, this being regulated by zener ZD1. The oscillator output from IC3 (at pin 3) will alternately switch on LEDs IC2a,52at a rate determined by the oscillator frequency. The switching action will actuate the photo-transistor portions of IC2a,b in sympathy. This will alternately gate the FETs Q1 and Q2. Power to the photo-transistor portion of IC2a is available via limiting resistor R6 (to prevent excess currents when IC2a is switched on). Once RL1 is energised the contact of RL1 will move to position B and so apply the 339 V between rails 14 and 12. C5 will begin to charge, initially providing a 15 volt supply to photo-transistor IC2b, as regulated by ZD2, via limiting resistor R9.

The oscillator action will alternately switch Q1 and Q2 (via the opto-isolators IC2a,b) so that when Q1 is conducting, the 339 V will be applied to the winding T1 connected to the common connection of Q1 and Q2, and when Q2 is alternatively conducting, OV will be applied to T1. This alternating action will cause an alternating current to flow in T1 and charge C8 to an average voltage of half supply, and induce a stepped down voltage in the secondary windings T2–T5. Once this transformer action has started, winding T5 can now provide the source of power via rectifier D6 to rail 13. Similarly, winding T4 will provide power via D8 to photo-transistor IC2b. The capacitor C5 will now be able to become fully charged.

The centre tapped secondaries T2, T3 provide the power supply output via rectifiers D9, 10 and smoothed by reservoir capacitor C9 to terminals 16 and 17. A similar rectification and smoothing system is provided by the additional outputs to terminals 18, 19 and 20.

Regulation of the supply output at terminals 16 and 17 is however additionally provided and is achieved by a rising output voltage being detected by zener ZD3 which will cause increased conduction of the LED portion of IC1 driven via transistor Q3. This causes the opto-coupled FET portion to decrease its resistance, thereby modifying the resistance relationship between R3, R1 and R4 (as the FET is parallel with R1). This relationship change affects the CR ratio between pins 6 and 7 of IC3 and so raises the frequency of oscillation of this device. This increase in frequency causes an increase in the switching rate of IC2a,b and Q1 and 2 hence a reduction in output voltage from the transformer secondaries so adjusting automatically the power supply output. The detection by ZD3 and the driving of ICI via transistor Q3 ensures regulation over a wide range of output currents, due to the high gain of the feedback circuit.

The provision of capacitor C8 in the primary winding allows charging and discharging through the transformer to provide the source of alternating current for use by this transformer and is more cost effective than providing four transistor switches in combination to drive the transformer circuit. In addition C8 (eg 2.2 μF) will provide some overload protection to the circuit.

When the power supply is no longer required and is switched off, the relay contact will return to position A and C5 can be discharged through D7 and R2 via D5.

Although transformer T may be toroidal, in the present configuration the transformer can be of minimal size compared to normal power supply transformers. Thus a Mullard CX3920 ferroxcube based transformer for example with 150 turn primary and 12 turn secondaries will be capable of handling at least 30 W. This is for a dimension of only 24 mm square (and containing all the secondary windings T2–T6). The configuration shown with optical control with only a single transformer and dual power transistor switching provision can be accommodated on board size of only 65×75 mm, so being only about one third size of typical commercially available units.

Tests on the power supply based on this configuration have shown that this can easily provide an output of 30 W. IC3 can typically run at 12 kHz with a regulation band of 5–30 KHz dependent on output power. As the regulating frequency increases the impedance in tl also increases which makes the current therethrough decrease. This in turn causes a reduced induced voltage in the secondaries and thus will regulate the output by reducing this voltage. As the control frequency goes down the impedance reduces and the induced voltage in T increases. The power supply gives a good degree of regulation eg better than ±2 percent and the efficiency is of the order of 85 percent. This gives a supply suitable for many applications with electronic circuits and without excessive heat generation problems. The transistors run almost cold at this rating so eliminating the need for forced draught cooling or large heatsinks. With a larger transformer and uprated transistors Q1 and Q2 larger power requirements could easily be handled.

I claim:

1. A power supply system including:
   first and second series-connected power FET switching means connected to receive a d.c. voltage;
   transformerless driving means comprising first and second optical driving means for driving the first and second switching means respectively;
   variable frequency generator means connected to switch said first and second switch means via the optical driving means at a switching rate determined by a frequency output of the generator means;
   transformer means having a plurality of windings including a first winding connected to at least one of the switching means, a second winding configured to provide a power supply output at a desired voltage, a third winding for providing a power supply to the variable frequency generator means, and a fourth winding for providing a power supply to the optical driving means;
   first rectification means connected to said second winding for converting the a.c. voltage at said second winding into a substantially d.c. voltage;
   second rectification means connected to said third winding to provide a d.c. power supply to said variable frequency generator means; and third rectification means connected to said fourth winding to provide a d.c. power supply to the optical driving means;
   sensing means for detecting output voltage errors; and optical feedback means including an opto-generator and a FET receiver for providing a control path from said sensing means to said variable frequency generator means to modify the switching frequency of the switching means by modifying the frequency output of the generator means to compensate for detected output errors.

2. A system as in claim 1 wherein:
   the first and second switching means each comprise at least one power FET,
   said generator means comprising an oscillator, and
   the opto-generator of said optical feedback means having a variable output dependent on output variations detected by said sensing means and which passes said variable output to the FET receiver associated with the oscillator for providing a variable frequency therefrom so as to adjust the switching rate of said first and second switching means.

3. A system as claimed in claim 2 wherein the sensing means includes a zener diode connected to a control transistor for driving the first opto-generator device.

4. A system as claimed in claim 3, wherein diverting means are included to provide an alternative power source for internal power requirements when unavailable from said transformer means.

5. A system as claimed in claim 4 wherein the diverting means are connected to be powered by an output derived from the d.c. voltage intended for the switching means.

6. A system as claimed in claim 4, wherein the diverting means includes a relay and the alternative power source includes a capacitor chargeable or dischargable through the path provided by the diverting means.

7. A system as claimed in any one of claims 1 to 2, wherein the first and second series connected switching means are connected at their node to one side of the primary winding of said transformer means and the second side of the transformer primary is connected in series with a capacitor to allow charging and discharging thereof through the transformer to provide the source of alternating current therefore.

8. A system as claimed in any one of claims 1 to 2, wherein the transformer means consists of a single transformer configuration constructed from a ferrite based material with windings associated therewith.

9. A power supply system including:
   first and second series-connected switching means connected to receive a d.c. voltage there-across;
   transformer driving means comprising first and second optical driving means for driving the first and second switching means respectively;
   a variable frequency oscillator having a frequency dependent upon a capacitance-resistance (CR) ratio for switching the first and second switching means via the optical driving means;
   transformer means having a first winding connected to the switching means to induce a voltage therein dependent on the switching rate of the switching means, said transformer means including at least one further winding configured to provide a power supply output at a desired voltage,
   rectification means for converting an a.c. voltage from the further winding into a substantially d.c. voltage;
   optical feedback means providing a control path between the output and the oscillator, said optical feedback means including an optical receiver configured to vary the capacitance-resistance (CR) ratio of the oscillator thereby to vary the frequency of the oscillator in dependence on fluctuations in the output voltage.

10. A system as claimed in claim 9 wherein the optical receiver comprises an opto-FET device, any resistance changes thereof modifying the CR ratio of the oscillator.

11. A system as claimed in claim 9 or 10 wherein a plurality of opto-emitting devices are connected to an output of the oscillator and associated opto-receivers are connected to the switching means, said oscillator driving the first and second switching means via the opto-emitting devices and associated receivers.

12. A system as claimed in claim 11 wherein the transformer means includes a winding for powering the oscillator and the opto-devices associated with the switching means.

13. A system as claimed in claim 12 wherein diverter means are provided to temporarily power the oscillator and the opto-devices prior to normal operation of the switching means.

14. A power supply system including:
   first and second series-connected switching means connected to receive a d.c. voltage;
   transformerless driving means comprising first and second optical driving means for driving the first and second switching means respectively;
   transformer means having a first winding connected to the switching means and having a second winding configured to provide a power supply output at a desired voltage;
   variable frequency generator means for switching the switching means via the optical driving means at a variable rate to increase or decrease the impedance of the first transformer winding as the frequency changes to induce a lower or higher voltage therein without changing the voltage applied to the switching means;
   rectification means for converting the output of the second transformer winding into a d.c. voltage and
   optical feedback means for sensing changes in this voltage and providing control information to the frequency generator means to vary the frequency thereof to bring the induced voltage back to said desired voltage.

15. A system as claimed in claim 14, wherein the first winding of the transformer means is connected in series with capacitive means to provide charging and discharging therethrough to cause induction of the voltage in the first winding.

16. A system as claimed in claims 14 or 15 wherein the first and second switching means each comprise a power FET and further including optically coupled semiconductors to drive the FETs at a rate determined by the frequency generator means.

17. A system as claimed in claim 16 wherein the optically coupled semiconductors and the frequency generator are powered by an output of the transformer.

* * * * *